United States Patent
Cipa et al.

(10) Patent No.: US 9,665,360 B2
(45) Date of Patent: May 30, 2017

(54) SYSTEM AND METHOD FOR UPDATING CONFIGURATION DATA FOR SUB-SYSTEMS OF AN AUTOMATED BANKING MACHINE

(75) Inventors: Dominik Cipa, Niederwangen (CH); Gunnar Kunz, Niederwangen (CH); Ulrich Marti, Niederwangen (CH); Olivier Martin, Niederwangen (CH)

(73) Assignee: Glory Global Solutions (International) Limited, Basingstoke, Hampshire (GB)

( * ) Notice: Subject to any disclaimer, the term of this patent is extended or adjusted under 35 U.S.C. 154(b) by 0 days.

(21) Appl. No.: 14/235,254

(22) PCT Filed: Jul. 24, 2012

(86) PCT No.: PCT/IB2012/001425
§ 371 (c)(1),
(2), (4) Date: Apr. 9, 2014

(87) PCT Pub. No.: WO2013/017925
PCT Pub. Date: Feb. 7, 2013

(65) Prior Publication Data
US 2014/0304693 A1  Oct. 9, 2014

Related U.S. Application Data

(60) Provisional application No. 61/513,023, filed on Jul. 29, 2011.

(51) Int. Cl.
*G06F 9/45* (2006.01)
*G06F 9/445* (2006.01)
(Continued)

(52) U.S. Cl.
CPC .......... *G06F 8/65* (2013.01); *G06Q 20/1085* (2013.01); *G06Q 20/40* (2013.01); *G07F 19/205* (2013.01); *G07F 19/206* (2013.01)

(58) Field of Classification Search
CPC ...... G06F 8/65; G06Q 20/40; G06Q 20/1085; G07F 19/205; G07F 19/206
See application file for complete search history.

(56) References Cited

U.S. PATENT DOCUMENTS 6,542,981 B1 * 4/2003 Zaidi ........................ G06F 8/65
712/2
6,672,505 B1 * 1/2004 Steinmetz et al. ............ 235/379
(Continued)

FOREIGN PATENT DOCUMENTS

CN    1296220 A    5/2001
CN    1347531 A    5/2002
(Continued)

OTHER PUBLICATIONS

Modupe Ayara et al., "Immunising Automated Teller Machines", [Online], 2005, pp. 404-417, [Retrieved from Internet on Feb. 14, 2017], <https://pdfs.semanticscholar.org/3766/e48c98a9a14b01e20801f70cd9fd2688d59a.pdf>.*
(Continued)

*Primary Examiner* — Ziaul A Chowdhury
(74) *Attorney, Agent, or Firm* — Boyle Fredrickson, S.C.

(57) ABSTRACT

A computer implemented method for updating configuration data in at least one automated banking machine is configured to execute configuration update steps embodied with a computer readable medium. The method includes identifying one or more sub-systems implemented within the automated banking machine, receiving an update to configuration data for at least one of the identified sub-systems, generating a restore point based on a current implementation of the sub-systems for the automated banking machine, and installing the configuration data in the automated banking machine. The identified sub-systems can include at least two
(Continued)

of roll storage modules, a note handling module controller, a note detector module, and an interface controller.

10 Claims, 4 Drawing Sheets

(51) Int. Cl.
*G07F 19/00* (2006.01)
*G06Q 20/10* (2012.01)
*G06Q 20/40* (2012.01)

(56) References Cited

U.S. PATENT DOCUMENTS

| | | | |
|---|---|---|---|
| 7,051,096 B1 | 5/2006 | Krawiec | |
| 7,555,461 B1 | 6/2009 | Drummond | |
| 8,083,141 B1* | 12/2011 | Courtright | G06Q 20/1085 235/380 |
| 8,229,816 B1* | 7/2012 | Mattison et al. | 705/35 |
| 8,403,205 B1* | 3/2013 | Billett | G07F 19/20 235/379 |
| 8,721,446 B2* | 5/2014 | Lee | G07F 17/323 463/42 |
| 2002/0053594 A1* | 5/2002 | Haney | B65H 5/025 235/381 |
| 2004/0148252 A1* | 7/2004 | Fleishman | G06Q 20/40 705/39 |
| 2004/0181297 A1* | 9/2004 | Chambers | G05B 19/056 700/31 |
| 2005/0022178 A1* | 1/2005 | Ghafoor | G06F 8/65 717/171 |
| 2006/0160622 A1* | 7/2006 | Lee | G07F 17/323 463/42 |
| 2006/0230394 A1* | 10/2006 | Forth et al. | 717/168 |
| 2009/0222811 A1* | 9/2009 | Faus | G06F 8/65 717/173 |
| 2010/0058313 A1* | 3/2010 | Hansmann et al. | 717/168 |
| 2010/0088230 A1 | 4/2010 | Drummond et al. | |
| 2010/0125556 A1* | 5/2010 | Bauer | G06F 11/1433 707/677 |
| 2010/0280871 A1* | 11/2010 | Goertz | G06Q 20/1085 705/43 |
| 2014/0107836 A1* | 4/2014 | Crews | G07F 19/206 700/236 |
| 2014/0165473 A1* | 6/2014 | Denny | G07F 19/205 49/381 |
| 2015/0220920 A1* | 8/2015 | Howe | G06Q 20/40 705/44 |

FOREIGN PATENT DOCUMENTS

| | | | |
|---|---|---|---|
| EP | 1096374 A2 | 5/2001 | |
| EP | 1096444 A2 | 5/2001 | |
| EP | 1096445 A2 | 5/2001 | |

OTHER PUBLICATIONS

Bruno Astuto A. Nunes et al., "A Survey of Software-Defined Networking: Past, Present, and Future of Programmable Networks", [Online],2014, pp. 1617-1634, [Retrieved from Internet on Feb. 14, 2017], <http://ieeexplore.ieee.org/stamp/stamp.jsp?arnumber=6739370>.*

Darren Kerbyson et al., "Performance Health Monitoring for Large-Scale Systems", [Online], 2012, pp. 1-9, [Retrieved from Internet on Feb. 14, 2017], <http://wwwx.cs.unc.edu/~tgamblin/whist-2012/papers/whist-2012-kerbyson.pdf>.*

Sérgio Ricardo Rota et al., "Run-Time Monitoring for Dependable Systems: an Approach and a Case Study", [Online], 2004, pp. 1-9, [Retrieved from Internet on Feb. 14, 2017], <http://ieeexplore.ieee.org/stamp/stamp.jsp?arnumber=1353002>.*

* cited by examiner

SYSTEM AND METHOD FOR UPDATING CONFIGURATION DATA FOR SUB-SYSTEMS OF AN AUTOMATED BANKING MACHINE

TECHNICAL FIELD

This invention relates to automated banking machines. Specifically this invention relates to an automated banking machine apparatus, method and system that is capable of use in a banking network.

BACKGROUND

Automated banking machines are well known. Two known examples of an automated banking machine which are commonly found in banks are a teller cash recycler (TCR) and a teller cash dispenser (TCD). A TCR can be used to deposit or dispense notes to a bank customer under the supervision of a bank teller. A TCD can dispense notes only, under bank teller supervision, to a customer. A further type of automated banking machine used by customers is an automated teller machine ("ATM"). ATMs enable customers to carry out banking transactions without any assistance from a teller. Common banking transactions that may be carried out with ATMs include the dispensing of cash, the making of deposits, the transfer of funds between accounts, the payment of bills and account balance inquiries. Other types of automated banking machines may allow customers to charge against accounts or to transfer funds. Other types of automated banking machines may print or dispense items of value such as coupons or vouchers. For the purposes of this disclosure an automated banking machine or automated transaction machine shall encompass any device which carries out transactions including transfers of value.

Automated banking machines, and also sub-system, components, etc. of the automated banking machine typically perform a multitude of functions based on instructions contained in installed software. The installed software interacts not only with the components of the system, but also components of other systems within the automated banking machine and with systems and components that are external to the automated banking machine.

Periodically, it will be necessary to update or completely replace the installed software for the automated banking machine. The replacement software maybe intended to replace software for the entire automated banking machine, software for a specific subsystem of the automated banking machine, and/or specific routines within existing software. The updates may be driven by changes in technology, evolutions in banking regulations, changes in security standards, etc.

Previously, a software engineer entirely overlayed new software for an automated banking machine and/or subsystem any time an update was performed. Further, the software engineer and/or the automated banking machine did not retain within memory a copy of the installed old version of software. Problems frequently arose, for example when an incorrect version of the software is installed, when newly installed software proved incompatible with either customizations to the automated banking machine and/or its sub-systems or with other systems in communication with the automated banking machine, when newly installed software introduced unforeseen errors, etc. Software engineers did not have a way to step back to previously installed versions for work automated banking machines without extensive effort. These problems could effectively disable an automated banking machine for an extended period of time.

SUMMARY OF THE INVENTION

In one aspect, a computer is adapted to receive automated banking machine configuration data and a memory is provided for storing at least a portion of said automated banking machine configuration data which has been successfully installed in order to enable rollback to a restore point if a subsequent installation attempt should fail.

One exemplary embodiment of the invention includes a computer implemented method for updating configuration data in at least one automated banking machine configured to execute configuration update steps embodied with a computer readable medium. The method includes identifying one or more sub-systems implemented within the automated banking machine, receiving an update to configuration data for at least one of the identified sub-systems, generating a restore point based on a current implementation of the sub-systems for the automated banking machine, and installing the configuration data in the automated banking machine. The identified sub-systems can include at least two of roll storage modules, a note handling module controller, a note detector module, and an interface controller.

In another embodiment, the update to configuration data includes metadata describing the update to the configuration data and configuration elements configured to modify the operation of the one or more sub-systems and/or the configuration data includes only one configuration element for each identified sub-system.

The metadata may include a UUID which unambiguously identifies the configuration data, a cryptographic signature which is used to enforce package authenticity and integrity, a version id which is used for traceability purposes, and a descriptive text providing a summary of the package content.

In another embodiment, the method further includes detecting a failure of one or more validation checks based on the installation of the configuration data and reconfiguring the operation of one or more of the identified sub-systems based on the restore point.

Another embodiment of the invention includes an automated banking machine including a plurality of sub-systems implemented within the automated banking machine configured to implement one or more function based on configuration data stored in a memory. The machine further includes a interface controller configured to perform the steps of receiving one or more configuration data updates, determining applicability of the one or more configuration data updates to the plurality of sub-system, generating a restore point based on a current implementation of the configuration data for one or more of the plurality of sub-systems for the automated banking machine, and installing the configuration data in the automated banking machine.

Other features and advantages of the invention will become apparent to those skilled in the art from the following detailed description and accompanying drawings. It should be understood, however, that the detailed description and specific examples, while indicating exemplary embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Exemplary embodiments of the invention are illustrated in the accompanying drawings in which like reference numerals represent like parts throughout light and in which.

DETAILED DESCRIPTION OF EXEMPLARY EMBODIMENTS

The automated banking machine described herebelow is a teller cash recycler (TCR). Its primary modes of operation involve receiving a stack of banknotes and storing them in appropriate storage modules, and dispensing banknotes from those storage modules to a user, typically a bank teller.

Figure 1:
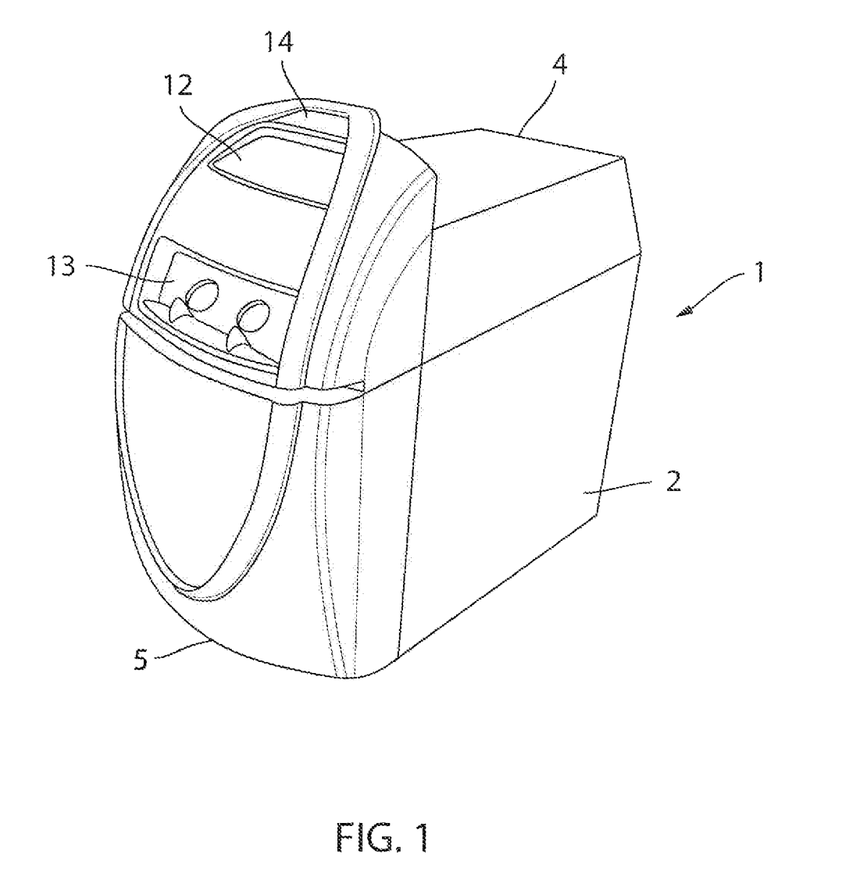
FIG. 1 is a perspective view of an automated banking machine, according to an exemplary embodiment.
Figure 2:
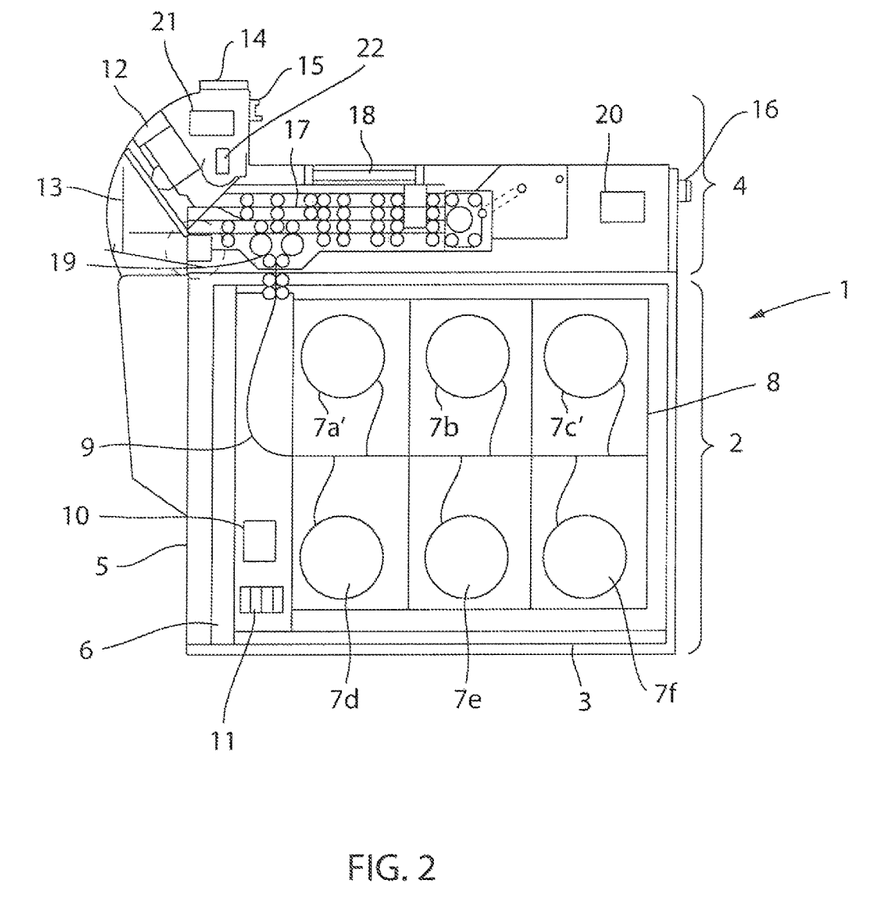
FIG. 2 is a schematic cross-sectional view of the automated banking machine of FIG. 1, according to an exemplary embodiment.

With reference to FIGS. 1 and 2, a TCR 1 comprises a (lower) cabinet 2 housing a safe 3 and an (upper) note handling module 4. The cabinet has a front panel 5 which can be opened to gain access to the safe 3 which, in turn is provided with a lockable door 6. The safe 3 houses a number of roll storage modules (RSMs) 7a-7f mounted on a frame 8, on which banknotes can be stored. Although the example shown incorporates six RSMs 7a-7f, other versions may include two, four, eight or more RSMs as desired Also inside the safe 3 is a lower note transport mechanism 9, several diverter switches (not shown) for diverting notes to one of the RSMs 7a-7f, a note transport and storage controller 10 and an internal display 11. The note handling module 4 includes an input module 12, a stacker 13, a touch screen 14 a USB socket 15 and a wired-network socket 16, all of which are accessible externally of the TCR 1. Inside the note handling module 4 are housed an upper transport mechanism 17, a detector module 18, a diverter switch 19, a note handling module controller 20, an interface controller 21 and a memory 22. The interface controller 21 is operably connected with the note transport and storage controller 10 via the note handling module controller 20 and by means of a CAN bus (not shown). The interface controller 21 is also operably connected with the touch screen 14 and memory 22. The internal display 11 is controlled by the lower transport controller 10.

Various modes of the TCR of FIGS. 1 and 2 will now be described. The detector modules 18, roll storage modules 7a-7f, transport mechanisms 17, 9 and diverter switch 19, are conventional and may operate in a fashion as described in Applicant's co-pending application WO 2008/047094. These components facilitate depositing banknotes which have been fed into the input module 12 by the user into the safe 3 and dispensing banknotes from the safe 3 into the stacker 13 for collection by the user.

Banknotes which have been placed into the input module 12 are fed one by one into the upper transport mechanism 17 for conveyance past the detector module 18 to the diverter switch 19. If the banknote is recognized by the detector module 18 as a bona fide note, the diverter switch 19 directs the banknote into the safe 3 and along the lower note transport mechanism 9 to a designated RSM 7a-7f. If a banknote is to be returned to the user, the diverter switch 9 directs the banknote to the stacker 13 from which it can be collected by the user. When a banknote is to be dispensed from a roll storage module 7a-7f, it is conveyed in the reverse direction out of the RSM along the lower note transport mechanism 9, and thence to the diverter switch 19 which directs the banknote to the stacker 13 where it can be collected by the user.

Instructions which cause the TCR to perform a transaction operation, such as depositing or dispensing one or more notes, are received by the interface controller. 21. In a first example, transaction operation instructions are generated at a teller workstation co-located with the TCR 1. These instructions are transmitted to the TCR 1 over a wired connection terminating at the wired-network socket 16 on the TCR 1. In an alternative arrangement, the instructions are transmitted wirelessly and the interface controller 21 is provided with a receiver for receiving such transmissions.

In either case, the instructions comprise at least one JavaScript Object Notation (JSON) document which is transported over a Secure Socket Layer (SSL) and using the Transmission Control Protocol/Internet Protocol (TCP/IP).

On receipt of a dispense instruction by the interface controller 21, the interface controller 21 processes the JSON document and generates further instructions for transmission to the note handling module controller 20 and note transport and storage controller 10 which in turn, activate the roll storage modules 7a-7f, diverter switch 19 and lower note transport mechanism 9 in order to dispense the amount of cash requested in the instruction. The interface controller 21 also generates a control signal for the touch screen 14 which displays a "Dispense in progress" message followed by "Dispense complete" in order to notify the teller that the transaction operation has been successful.

On receipt of a deposit instruction by the interface controller 21, the interface controller 21 processes the JSON document and generates further instructions for transmission to the note handling module controller 20, and note transport and storage controller 10 which in turn, activate the detector module 18, the roll storage modules 7a-7f, diverter switch 19 and transport mechanisms 9 and 17 in order to authenticate and store the notes which a teller has placed in the input module 12. The interface controller 21 also generates a control signal for the touch screen 14 which displays the value of the deposited notes to the teller.

In a second example, transaction operation instructions are generated at a remote monitoring station, such as a banking network's central computer. As in the first example, these instructions are transmitted to the TCR 1 over a wired or wireless communications channel and comprise at least one JavaScript Object Notation (JSON) document which is transported over a Secure Socket Layer (SSL) and using the Transmission Control Protocol/Internet Protocol (TCP/IP). Alternatively, the JSON document may be transported using the Hypertext Transfer Protocol Secure (HTTPS) communications protocol or using any other secure transport system and/or method. However, for convenience, the method with be described hereinafter with reference to SSL.

On receipt of a dispense or deposit instruction from the remote central computer by the interface controller 21, the interface controller 21 processes the JSON document and generates further instructions for transmission as in the first example.

In a third example of an operating mode of the TCR 1 the interface controller 21 generates JSON documents and transmits them over a communications link (wired or wireless) over SSL using TCP/IP to a monitoring station. These messages include status information and the monitoring station can be a banking network's central computer or a servicing agency. Status information can typically and usefully include fault reporting, the number of the notes in each RSM and the, number of transactions performed during a particular time period.

Figure 3:
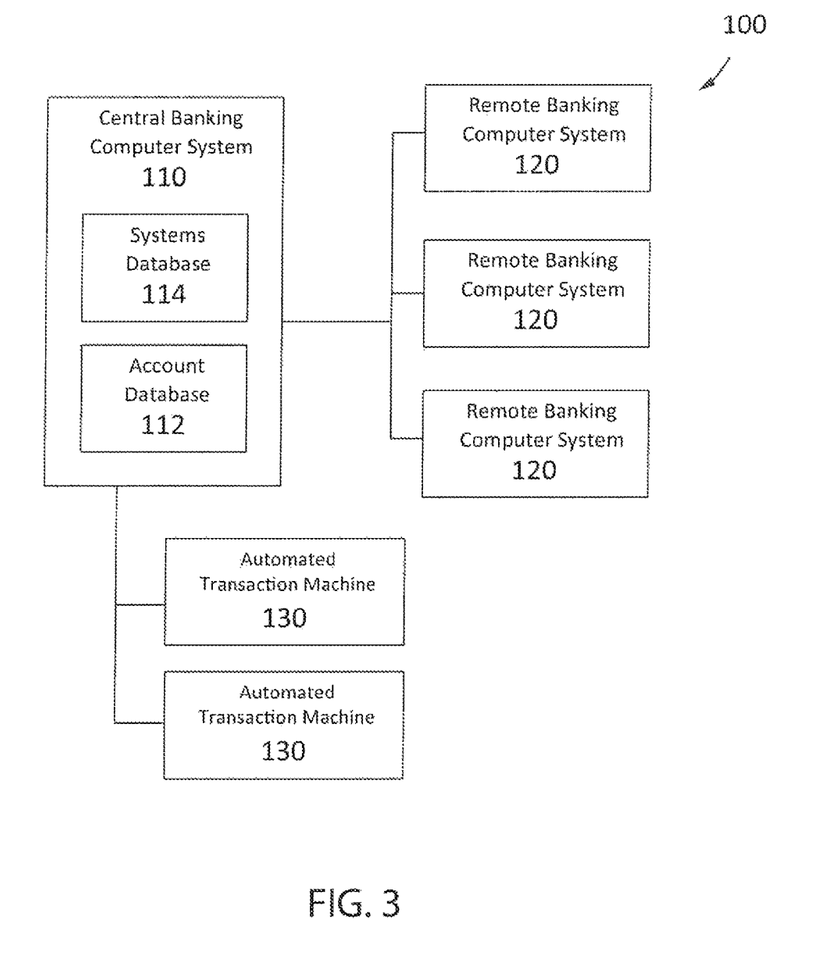
FIG. 3 is a representation of a system of automated banking machine receiving configuration data updates from a central banking systems, according to an exemplary embodiment.

Referring now to FIG. 3, a system 100 for configuring one or more automated transaction machines is shown, according to an exemplary embodiment. System 100 includes a central banking computer system 110, one or more remote banking computer systems 120, and at least one automated transaction machine 130.

Central banking computer system 110 may be a typical bank computer system configured to include a relational database and electronic file system 112 of consumer and business accounts that contain information about every account holder associated with the bank or credit union. In one embodiment, account database 112 includes name and address information, a variety of financial accounts such as checking, savings, loans, and investments such as certificate of deposit and investment retirement accounts. Account database 112 typically resides on secure computer servers (not shown) with highly redundant components to maintain the integrity of the account holder files. System 110 also provides functions such as administration and management reporting, settlement, statement generation, financial projections, interest calculations, amortization, and overall general ledger functions required to manage the bank and credit union as required by federal regulations.

According to an exemplary embodiment, central banking system 110 further includes a systems software database 114. Systems software database 114 includes a record of configuration data for the automated banking machines 120, and their associated sub-systems. Exemplary sub-systems may include, but are not limited to physical machine sub-systems such as the roll storage modules 7a-7f, and also to logical sub-systems such as the note handling module controller 20, OS, detector module configuration (e.g. pattern-sets) or interface controller access control. Configuration data typically comprises at least some of the following: machine parameters, configuration scripts, firmware, operating system (OS) updates, pattern-sets, detection process configurations, etc.

According to an exemplary embodiment, system 100 may be configured as a push or pull system, or some combination thereof, for dissemination of updated configuration information from central banking computer system 110 to automated banking machines 130. In push system, system 110 may be configured to detect modification to one or more configuration data files stored in database 114. In a pull system, systems 130 may either detect a need to update configuration files or may periodically poll system 110 to determine whether the configuration data stored on the particular machine 130 is the most recent configuration data. Alternatively, configuration data may be communicated between central system 110 and remote systems 120 based on particular automated banking machines 130 associated with the remote system 120.

Although systems software database 114 is shown and described herein as being a component of system 110, systems software database 114 and associated control software may alternatively be implemented using a stand alone system.

Utilizing remote banking computer systems 120, account holders, either directly or through a bank employee, create transaction messages that initiate the primary financial services of deposit, withdrawal, account transfer, inquiry, and file maintenance for their accounts residing in account database 112. Systems 120 may be configured to communicate with system 110 to perform the transactions and update the corresponding data within account database 112. Systems 120 may further be configured to store configuration data and to communication with system 110 to facilitate updates to configuration data for operating machines and/or initial configuration of a new machine 130.

Remote banking computer systems 120 may be computer systems within the central bank location housing the central banking computer system 110, computer systems within one or more remote bank locations, etc. Banking computer systems 120 may further be account holder computing systems, such as the account holder's home or office computing system, using an interface, such as a web browser, to access the central banking computer system 110. Account holder transactions generated at a banking computer systems 120 may be routed by secure communication channels to system 110 to complete core accounting functions.

Within system 100, banking computer systems 120 may be instructed to perform transactions requiring the physical transfer of currency including, for example deposit and withdrawal transactions. However, banking computer systems 120 may not be configured for receiving and dispensing currency and/or associate with users that are tasked with performing that function. One such example includes the account holder in a bank branch talking to a banker about a mortgage, for example, and requesting that the mortgage banker also perform a withdrawal transaction. Another such example may include the account holder using their home computing system to perform a withdrawal operation.

Figure 4:
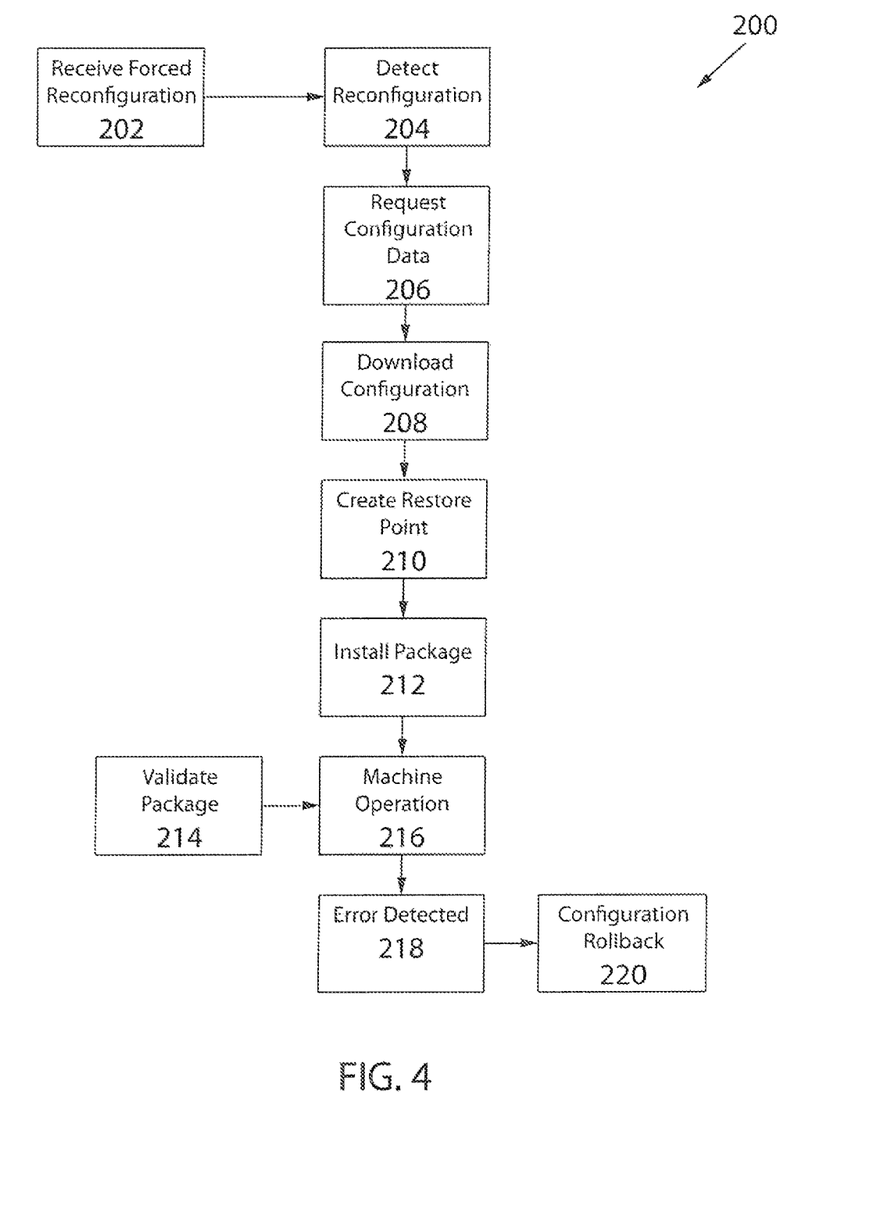
FIG. 4 is flowchart illustrating a method for installing one or more configuration updates to sub-systems of an automated banking machine, according to an exemplary embodiment.

Referring now to FIG. 4, a flowchart 200 illustrating a method of downloading and installing configuration data into the teller cash recycling machine 1 of FIG. 1 will now be described. The steps of flowchart 200 may be implemented by interface controller 21 based on received updated configuration memory stored in a computer-readable memory and based on the steps provided below and described in computer code also stored in the computer readable memory. Although flowchart 200 shows specific steps performed in a specific order, it is important to recognize that the method may be performed with more, fewer, and/or a different ordering of steps to implement the functionality described herein.

In a step 202, interface controller 21 receives an indication that an update is required. The indication may be received, for example, from central banking system 110, based on a detected change to configuration information stored thereupon. According to an exemplary embodiment, the update may be received based on a record of the sub-system controlled by interface controller 21 and a detected change to configuration data specific to those sub-systems. Alternatively, in a step 204, interface controller 21 may detect the change to configuration data itself, such as by receiving configuration data directly at machine 130 as described below and/or may periodically poll system 110 to detect changes to configuration data specific to the sub-systems controlled by interface controller 21.

In a step 206, interface controller 21 requests configuration data package updates from system 110. The configuration data request may be configured to include a listing of the sub-systems specific to the requesting machine 130 and/or controller 21.

In a step 208, interface controller 21 receives one or more configuration data updates (described in further detail below) at a banking machine 130. Such configuration data can be accessed by the TCR 1 from a remote source, such as central banking system 110, and received by the interface controller 21 over a wired connection, through the wired network socket 16, or wirelessly. Conveniently, the configuration data can be downloaded as a package which is in a compressed (zipped) form and saved to memory.

Configuration data typically comprises at least some of the following; machine parameters, configuration scripts, firmware, operating system (OS) updates, pattern-sets, detection process configurations. A configuration data package contains two major parts; meta-data and configuration elements.

The package meta-data contains the following set of information: a UUID which unambiguously identifies the configuration package, a cryptographic signature which is: used to enforce package authenticity and integrity, a version id which is used for traceability purposes, and a descriptive text: which may be displayed on the touch screen 14 to give a summary of the package content.

In a step 210, upon receiving a configuration data update, interface controller 21 may be configured to automatically create a restore point. The creation of a system restore point allows the interface controller 21 to prepare for configuration rollbacks. A system restore point is automatically created at the end of a successful installation by simply storing the whole set of successfully installed configuration elements in the memory 22 along with the last set of user defined settings (ie. a list of key-value pairs). Physically this works by exactly just keeping the last successfully installed configuration element per sub-system. If a full configuration package is to be installed, then the complete last restore point is replaced by the new set of configuration elements. If, however, an update configuration package which just contains a sub-set of all configuration elements is to be installed, then the process just updates the relevant configuration elements out of the last restore point.

Another option allows for user defined restore points. For example, a field engineer creates a manual restore point (e.g. saved under the corresponding time-stamp) and subsequently performs an update of the machine. If the installation is successful but after some time the customer requests to go back to the previous configuration, having the manual restore point allows rollback to this point.

Another further option involves exporting system restore points to an external storage media and re-applying them to other automated banking machines. A cryptographic signature may be applied to the exported restore point.

In step 212, the interface controller 21 is adapted to install the received configuration package. The package's configuration elements contain the actual machine configuration data, where each configuration element targets a specific "installation target." A configuration package will not contain more than one configuration element per installation target. The term "installation target" refers to physical machine sub-systems such as the roll storage modules 7a-7f, and also to logical sub-systems such as the note handling module controller 20, OS, detector module configuration (e.g. pattern-sets) or interface controller access control. Depending on the particular installation target (sub-system) a configuration element might contain a variety of configuration data types. The interface controller 21 is configured to handle these transparently. Configuration elements typically carry machine parameters, configuration scripts, firmware, OS updates, pattern sets, and detection process configurations.

In order to allow the interface controller 21 to handle the configuration elements transparently, each element consists of meta-information and the configuration data itself. The configuration element meta-data includes: a UUID which: unambiguously identifies the configuration element, an installation target id which identifies the logical or physical target sub-system, a priority id which is used to define an order in which configuration elements are installed and rolled-back, a list of compatibility id's which are used to check if the element may be installed on the targeted subsystem or not, a version id: used for traceability only and a descriptive text: which may be displayed on the touch screen 14 to provide the characteristics of the configuration element (e.g. "Detector module configuration package").

The next process is the installation of the particular configuration package (e.g. identified by its UUID). This installation comprises the following steps: compiling a map of the state of all user level configuration parameters (based on key-value pairs); iterating over all configuration elements (sorted by its priority field) and forwarding the configuration data to the corresponding sub-system; restoring all user-level configuration parameters to the state that has been cached in the compilation step; and creating a system restore point. Conveniently, the note handling module controller 20 can act as proxy for all device-level sub-systems. In cases where the UUID of a configuration element matches the UUID of a previously installed element or previously created restore point, the installation process may be skipped. The compiling and restoring steps facilitate recovery of potential user specific settings after the package installation. However there is a potential conflict between configuration package parameters and user defined settings. To resolve the issue of which should take precedence, the interface controller 21 maintains a configurable list of parameter keys that are to be restored after the successful installation of a configuration package. Hence, only those parameters whose keys are found in the list are restored.

In a step 214, interface controller 21 is configured to perform validation testing of the installed configuration updates. Validation testing may include a complete testing of all functionality associated with the machine 130, testing of specific functions associated with configuration updates, testing of the installation of the configuration updates, etc. When the interface controller 21 has received a configuration data package it will validate it and, if successful, store it in its internal memory. If the package is not valid, it will be rejected. The validation process includes two steps. Firstly, the package's signature is validated. The configuration package's meta-data includes a cryptographic signature. This protects the package content against external, unauthorized manipulation and furthermore enables an integrity check on the package content (like a check-sum). Secondly, a hardware compatibility check is done. The configuration elements' meta-data contains a list of hardware compatibility IDs. The aim of this validation is to check if the configuration package content is compatible with the machine's hardware and software configuration. This check is repeated after a successful installation.

Alternatively, or following the validation testing in step 214, machine 216 may be configured to resume normal operation following installation of the configuration updates in a step 216.

In certain instances it may be desired to install or rollback individual configuration elements in a certain order (e.g. OS update first then firmware then parameters). For example, in a step 218, a determination may be made whether an error has been detected during validation testing step 214 or normal operation step 216. The interface controller 21 is therefore configured to install or rollback individual configuration elements in the order of increasing priority. Optionally, a configuration element may reference additional configuration data that can be executed in order to undo a previous installation.

A process for applying a restore point in the event of a rollback in a step 220 will now be described. In case anything goes wrong during the installation of a configuration package, the interface controller 21 will revert all configuration elements that have already been installed (including the one that has caused the failure) to the last automatic restore point. Note that an initial restore point will be an original factory setting restore point. The rollback algorithm works as follows. The interface controller 21 iterates over the set of configuration elements (sorted by priority-id) of the last restore point and checks if the UUID of the element matches the one that is installed in the corresponding sub-system. Further, the interface controller 21 checks if the last installation state of the configuration element is set to "VALID." If one or the other check delivers 'false' the configuration element is reinstalled by the one that is hosted within the last restore point. After this procedure the interface controller 21 restores the last set of user-settings from the restore point. Note that the rollback scenario requires the restoration of all user-setting as in this scenario user-settings take precedence over package settings.

As an alternative to automatic rollbacks in cases of installation failures, rollback to a manual restore point, or rollback to an exported restore point can be implemented. The rollback procedure can advantageously provides a tool for automatically recovering the machine in cases of hardware repairs (e.g. replacement of PCBs or complete modules etc. in the field).

In a further embodiment, the teller cash recycling machine 1 of FIG. 1 is provided with means for guarding against tampering, such as the unauthorized replacement of the interface controller 21. The note transport and storage controller 10 is in a secure location inside the safe 3 but the interface controller 21 is more vulnerable as it is outside the safe 3. The note transport and storage controller 10 needs to be sure that the interface controller 21, with which it is communicating, is the bona fide one and not one which has been tampered with or replaced. It also needs to know whether an operator who has gained access to the machine's interior is authorized to do so. These are achieved by way of the following process. Firstly the (authorized) operator unlocks and opens the safe door 6. Next, the operator plugs into the USB port 15 a security dongle (not shown). This step unlocks the touch screen 14. When the door 6 is opened, the interior display 11 is visible to the operator. On the interior display 11 is a sequence of numbers which is known to the note transport and storage controller 10. The operator subsequently enters into the touch screen 14 the sequence of numbers displayed. The entered sequence is relayed to the note transport and storage controller 10 via the interface controller 21, and note handling module controller 20. The note transport and storage controller 10 compares the entered sequence with the known sequence. If the sequences match, then the interface controller 21 is deemed to be bona fide and the operator authorized. If the sequences do not match, then the note transport and storage controller 10 disables operation of the machine and no banknotes can be dispensed.

A refinement to the authorization procedure described above can be provided as follows. The sequence of numbers which are displayed on the internal display 11 and entered into the touchscreen 14 are used by the interface controller 21 and the transport and storage controller 10 to compute a symmetrical secret key. This key is used by the interface controller 21 to encrypt its own serial number and that of the note transport and storage controller 10. Data comprising these encrypted serial numbers are then transmitted from the interface controller 21 to the note transport and storage controller 10 for validation.

We claim:

1. A computer implemented method for updating configuration data in at least one automated banking machine configured to execute configuration update steps embodied with a computer readable medium, the steps comprising identifying one or more sub-systems implemented within the automated banking machine, the sub-systems being one or more physical machine components of the automated banking machine configured to implement one or more distinct functions based on configuration data stored in a memory, one or more logical components of the automated banking machine, or a combination of physical machine components and logical components of the automated banking machine, wherein the identified sub-systems include at least two of one or more roll storage modules, a note handling module controller, a note detector module, and an interface controller;

receiving an update to configuration data for at least one of the identified sub-systems at the automated banking machine, the configuration data being at least one of a machine parameter, a configuration script, firmware, and an operating system update;

generating a restore point at the automated banking machine based on a current implementation of the sub-systems for the automated banking machine by using an interface controller component of the automated banking machine to create the restore point for storage in the memory of the automated banking machine; and installing the configuration data in the automated banking machine.

2. The method of claim 1, wherein the update to configuration data includes metadata describing the update to the configuration data and configuration elements configured to modify the operation of the one or more sub-systems.

3. The method of claim 2, wherein the configuration data includes only one configuration element for each identified sub-system.

4. The method of claim 2, wherein the metadata includes an identifier which unambiguously identifies the configuration data, a cryptographic signature which is used to enforce package authenticity and integrity, a version id which is used for traceability purposes, and a descriptive text providing a summary of the package content.

5. The method of claim 1, further including detecting a failure of one or more validation cheeks based on the installation of the configuration data and reconfiguring the operation of one or more of the identified sub-systems based on the restore point.

6. An automated banking machine, comprising:
a central processing unit;
a memory;

a plurality of sub-systems implemented within the automated banking machine configured to implement one or more functions based on configuration data stored in the memory, the sub-systems being one or more physical machine components of the automated banking machine, one or more logical components of the automated banking machine, or a combination of physical machine components and logical components of the automated banking machine and include at least two of one or more roll storage modules, a note handling module controller, a note detector module, and an interface controller;

the interface controller configured to perform the steps of:
　receiving one or more configuration data updates at the automated banking machine, the configuration data being at least one of a machine parameter, a configuration script, firmware, and an operating system update;
　determining applicability of the one or more configuration data updates to the plurality of sub-systems;
　generating a restore point at the automated banking machine based on a current implementation of the configuration data for one or more of the plurality of sub-systems for the automated banking machine by using the interface controller component of the automated banking machine to create the restore point for storage in the memory of the automated banking machine; and
　installing the configuration data in the automated banking machine.

7. The machine of claim 6, each configuration data update includes
　metadata describing the update to the configuration data, and
　configuration elements configured to modify the operation of the one or more sub-systems.

8. The machine of claim 7, wherein the configuration data includes no more than one configuration element for each identified sub-system.

9. The machine of claim 7, wherein the metadata includes an identifier which unambiguously identifies the configuration data, a cryptographic signature which is used to enforce package authenticity and integrity, a version id which is used for traceability purposes, and a descriptive text providing a summary of the package content.

10. The method of claim 7, further including detecting a failure of one or more validation checks based on the installation of the configuration data and reconfiguring the operation of one or more of the identified sub-systems based on the restore point.

* * * * *